United States Patent [19]

Minnella

[11] Patent Number: 4,818,260

[45] Date of Patent: Apr. 4, 1989

[54] AIR BRUSH CLEANING DEVICE

[76] Inventor: Joseph Minnella, 38 Budenos Dr., Sayville, N.Y. 11782

[21] Appl. No.: 166,504

[22] Filed: Mar. 10, 1988

[51] Int. Cl.[4] .............................................. B01D 50/00

[52] U.S. Cl. ..................................... 55/385.4; 55/387; 220/86 R

[58] Field of Search ...................... 55/385 C, 387, 319, 55/320, 250; 15/310; 220/86 R

[56] References Cited

U.S. PATENT DOCUMENTS 1,828,816 10/1931 Pierson .................................. 55/250

2,953,217 9/1960 Turner et al. .......................... 55/251

3,308,610 3/1967 Springer et al. ...................... 55/471

FOREIGN PATENT DOCUMENTS 2714808 10/1978 Fed. Rep. of Germany ........ 55/255

*Primary Examiner*—Bernard Nozick

*Attorney, Agent, or Firm*—Alfred M. Walker

[57] ABSTRACT

A device for cleaning of air brushes has a container for accommodating a paint discharged from the air brush, a passage for introducing the paint into the container, and a plurality of openings through which paint vapors are evacuated from the container and absorbed by an absorbent.

11 Claims, 3 Drawing Sheets

AIR BRUSH CLEANING DEVICE

BACKGROUND OF THE INVENTION

The present invention relates to a device for cleaning air brushes.

Air brushes are used for spraying paints onto respective objects. After a certain time of use of an air brush or for changing the colors of paint, the air brush must be cleaned. The cleaning spray of paint is generally released into the ambient atmosphere. Since such a release leads to pollution of the atmosphere with the paints and other contaminants, it was proposed to use special devices for spraying the paint through or into them, to minimize the pollution of the ambient atmosphere. Some of these devices are disclosed in U.S. Pats. Nos. 232,141; 205,665; 418,738; 578,671; 1,396,584; 2,778,448; 2,512,542; 2,978,186; 3,584,787; 3,815,819; 4,113,454; 4,606,776; 4,671,708. The devices disclosed in these patents can be further improved in the sense of simplification of their construction and increase of efficiency of cleaning.

SUMMARY OF THE INVENTION

Accordingly, it is an object of the present invention to provide an air brush cleaning device which avoids the disadvantages of the prior art, and to provide a device which is an improvement of the existing devices.

In keeping with these objects and with others which will become apparent hereinafter, one feature of the present invention resides, briefly stated, in a cleaning device which has a container with an inner chamber for receiving a paint and with a wall which has a passage for passing the paint into the inner chamber and a plurality of openings for evacuating vapors of paint from the inner chamber, and a filter associated with these openings for absorbing the vapors.

The novel features of the present invention are set forth in particular in the appended claims. The invention itself, however, will be best understood from the following description accompanied by the following drawings.

DESCRIPTION OF PREFERRED EMBODIMENT

Figure 1:
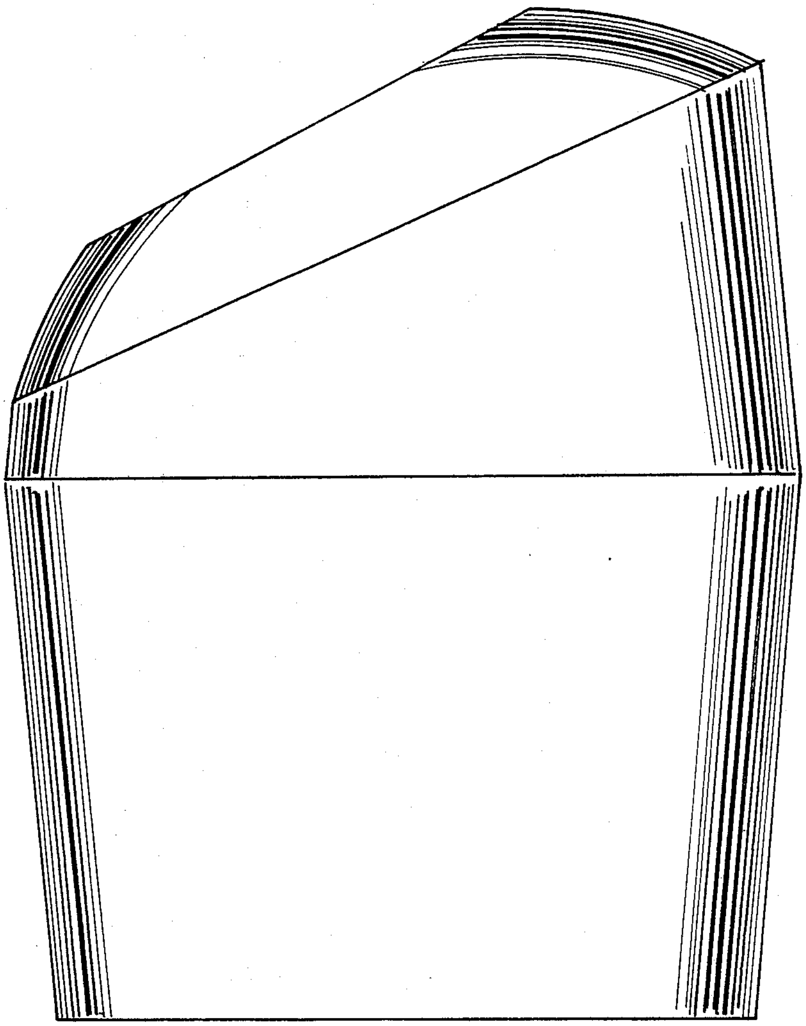
FIG. 1 is a view showing a device for cleaning an air brush, in accordance with the present invention, in a perspective.
Figure 2:
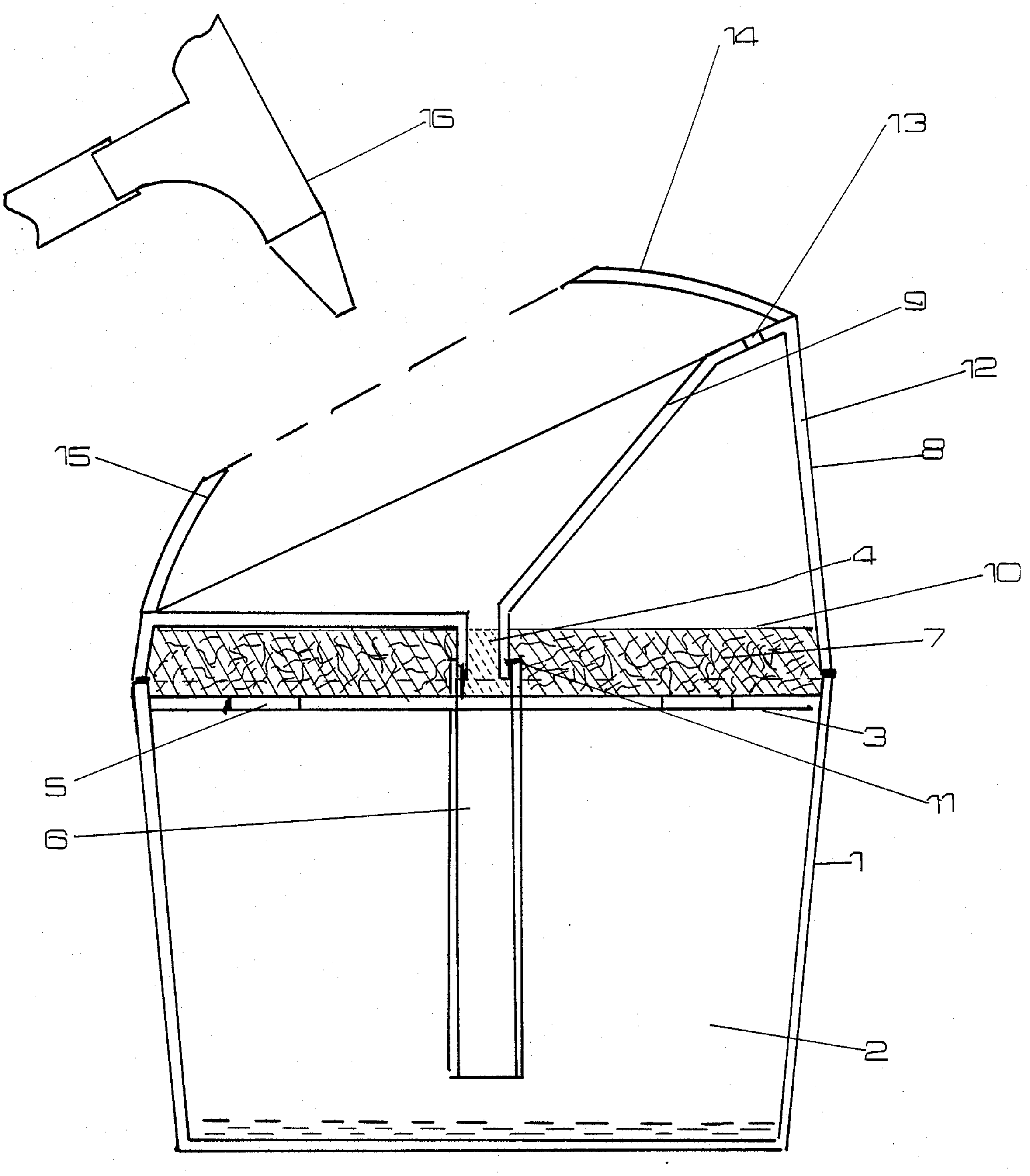
FIG. 2 is a cross section of the invention device for cleaning an air brush, in an assembled position.
Figure 3:
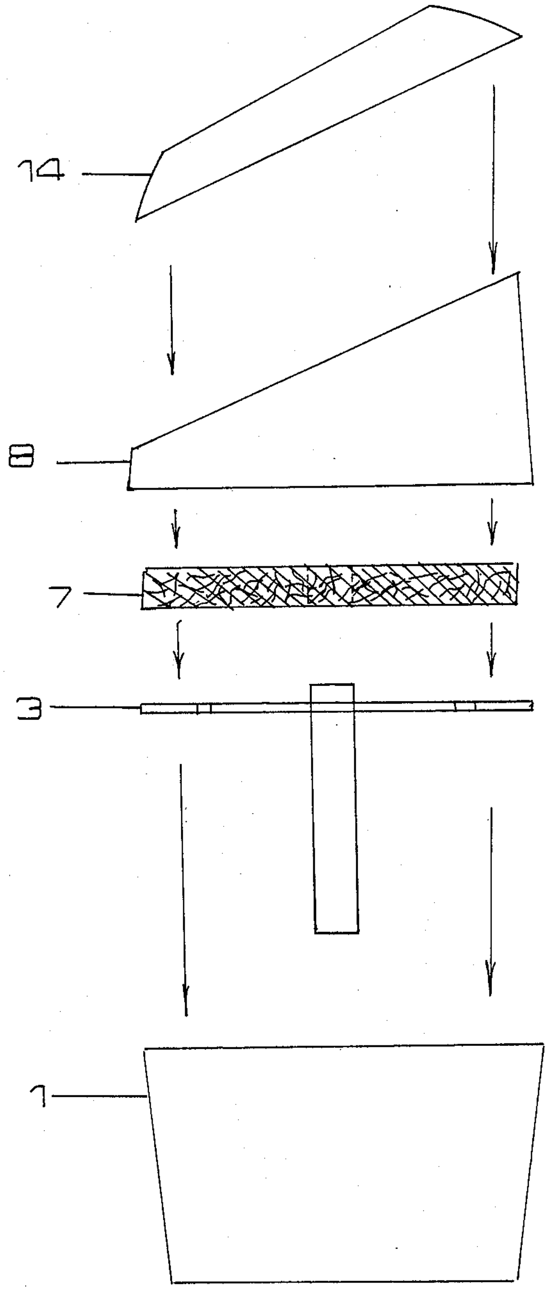
FIG. 3 is an exploded view of the device for cleaning an air brush, in accordance with the present invention.

A cleaning device for air brushes has a container which is identified with reference numeral 1 and limits an inner chamber 2 for receiving a paint. The container 1 has an upper horizontal wall 3 which closes the inner chamber from above. The upper wall 3 has a central passage 4 through which the paint can be introduced into the interior of the inner chamber 2. The upper wall 3 is also provided with a plurality of openings 5 through which the vapors (fumes) from the paint accommodated in the inner chamber 2 can escape upwardly.

The upper wall 3 can be formed as a separate plate which is removably mounted in the container. This plate can be connected with a guiding tube 6 which guides the paint not only through the passage 4, but also downwardly to a bottom region of the inner chamber 2 of the container 1. It is to be understood that well known means can be used for removable connection of the plate 3 with the container 1, and also for the connection of the plate 3 with the guiding tube 6.

Filtering means is further provided for absorbing the vapors (fumes) from the paint. The filtering means includes a known absorbent filter, for example a foam-like sponge 7. The filter is located on the plate 3 above the openings 5 for evacuation of the paint vapors. It is believed to be clear that any suitable filtering material can be used for the filter 7.

The cleaning device further has a guiding lid 8 for guiding the paint toward the inlet of the container 1 or more particularly to the inlet of the guiding tube 6. The guiding lid is formed as a funnel which has an inclined wall 9 with an inclination directed towards the inlet of the guiding tube 6, for directing the paint towards the inlet. The guiding lid is also provided with a lower closing edge 10 which is located above the plate 3 so that the filter 7 is sandwiched between the plate 3 and the closing edge 10. Further, the guiding lid has an outlet tube 11 which engages into the inlet part of the guiding tube 6 for centering the guiding lid 8 relative to the container 1. Finally, a peripheral wall 12 of the guiding lid 8 is in an end-to-end abutment with the peripheral wall of the container 1. A vent 13 is also provided in the upper part of the guiding lid, for evacuating some vapors which can eventually escape.

The cleaning device is also provided with a splash preventing shield 14 which prevents splashing of the paint during its discharge into the device. The shield 14 has a smaller inlet cross section, a greater outlet cross section, and a peripheral wall 15 which extends from the inlet to the outlet cross section and widens towards the latter.

It is believed that the operation of the inventive device is clear from the description of its construction. An air brush 16 discharges a paint into the device, so that the paint passes through the shield 14, is guided through the lid 8, and accumulates in the container 1, while the vapors escape through the openings 5 and are absorbed by the filter 7.

The parts 1,8,14 of the inventive cleaning device are removably connected with one another by known means, and can be disassembled for cleaning of the cleaning device itself.

The invention is not limited to the details shown, since various modifications and structural changes are possible without departing in any way from the spirit of the present invention.

What is desired to be protected by letters patent is set forth in particular in the appended claims.

I claim

1. An air brush cleaning device, comprising a container limiting an inner chamber and having a substantially horizontal wall, means for introducing a paint from an air brush into said inner chamber of said container and including a through going passage provided in said wall, means for absorbing vapors produced from the paint and including a plurality of openings provided in said wall and filtering means associated with said openings, so that the paint is introduced into said inner chamber through said passage while the vapors escape from said inner chamber through said openings and are absorbed by said filtering means, means for guiding the paint toward said passage in said wall and including a guiding lid which is located upstream of said container and removably connected with said container, said guiding lid being funnel-shaped and including at least one inner wall which is inclined toward said passage and an inlet for the paint so that when the paint is introduced into said guiding lid through said inlet it is guided by said inclined wall towards said passage of said container, said guiding lid having an outlet in a connected position with said container, which outlet is substantially aligned with said passage of said container, and a closing wall which in the connected position prevents propagation of the vapors, which escape from said inner chamber of said container through said openings, from entering said guiding lid, said passage of said container being provided with a guiding tube which extends from said passage into an interior of said inner chamber of said container, said outlet of said guiding lid having a short outlet tube which is engageable with said guiding tube of said passage of said container.

2. An air brush cleaning device as defined in claim 1, wherein said absorbing means is located between said substantially horizontal wall of said container and said closing wall of said guiding lid.

3. An air brush cleaning device as defined in claim 1, wherein said guiding tube extending from said passage into an interior of said inner chamber, said container having a peripheral wall, said guiding tube being connected with said wall which is provided with said passage and said openings so as to form a unit which is removably connected with said peripheral wall of said container.

4. An air brush cleaning device as defined in claim 1, wherein said container has a bottom wall, a peripheral wall, and a top wall, said wall in which said passage, and said plurality of openings are provided being formed as said top wall of said container.

5. An air brush cleaning device as defined in claim 4, wherein said top wall of said container is removably attached to other of said walls of said container.

6. An air brush cleaning device, comprising a container limiting an inner chamber and having a substantially horizontal wall, means for introducing a paint from an air brush into said inner chamber of said container and including a through going passage provided in said wall, means for absorbing vapors produced from the paint and including a plurality of openings provided in said wall and filtering means associated with said openings, so that the paint is introduced into said inner chamber through said passage while the vapors escape from said inner chamber through said openings and are absorbed by said filtering means, means for guiding the paint towards said passage in said wall and including a guiding lid which is located upstream of said container and removably connected with said container, means for preventing splashing of the paint during its introduction into said guiding lid, said splash preventing means including a splash shield located upstream of said guiding lid and connected therewith, said splash shield having an inlet cross section for introducing the paint, an outlet cross section for discharging the paint toward said guiding lid, and a peripheral wall extending from said inner to said outer cross sections in a widening manner.

7. An air brush cleaning device as defined in claim 6, further comprising a guiding tube associated with and extending from said passage in said wall into an interior of said inner chamber of said container, so as to guide the paint from said passage further into said inner chamber.

8. An air brush cleaning device as defined in claim 6, wherein said absorbing means is located between said substantially horizontal wall of said container and said closing wall of said guiding lid.

9. An air brush cleaning device as defined in claim 6, wherein said guiding tube extending from said passage into an interior of said inner chamber, said container having a peripheral wall, said guiding tube being connected with said wall which is provided with said passage and said openings so as to form a unit which is removably connected with said peripheral wall of said container.

10. An air brush cleaning device as defined in claim 6, wherein said container has a bottom wall, a peripheral wall, and a top wall, said wall in which said passage, and said plurality of openings are provided being formed as said top wall of said container.

11. An air brush cleaning device as defined in claim 10, wherein said top wall of said container is removably attached to other of said walls of said container.

* * * * *